(12) United States Patent
Kaida et al.

(10) Patent No.: US 8,625,148 B2
(45) Date of Patent: Jan. 7, 2014

(54) IMAGE PROCESSING APPARATUS, METHOD OF MANAGING IMAGE OUTPUT, AND STORAGE MEDIUM

(75) Inventors: Yukiko Kaida, Tokyo (JP); Ryonosuke Miyazaki, Tokyo (JP); Hiroaki Ikkanzaka, Tokyo (JP); Shigeo Negoro, Tokyo (JP)

(73) Assignee: Ricoh Company Limited, Tokyo (JP)

( * ) Notice: Subject to any disclaimer, the term of this patent is extended or adjusted under 35 U.S.C. 154(b) by 660 days.

(21) Appl. No.: 12/836,086

(22) Filed: Jul. 14, 2010

(65) Prior Publication Data

US 2011/0013214 A1 Jan. 20, 2011

(30) Foreign Application Priority Data

Jul. 16, 2009 (JP) ................. 2009-167960

(51) Int. Cl.
*G06K 15/00* (2006.01)
(52) U.S. Cl.
USPC ....................................... 358/1.18
(58) Field of Classification Search
USPC ........................ 358/1.15, 3.03, 1.18
See application file for complete search history.

(56) References Cited

U.S. PATENT DOCUMENTS

2004/0047002 A1* 3/2004 Nishi ........................... 358/1.18

FOREIGN PATENT DOCUMENTS

| JP | 2002-366542 | 12/2002 |
|---|---|---|
| JP | 2003-177879 | 6/2003 |
| JP | 2005-267021 | 9/2005 |
| JP | 2006-139611 | 6/2006 |

* cited by examiner

*Primary Examiner* — Marivelisse Santiago Cordero
*Assistant Examiner* — Mesfin Getaneh
(74) *Attorney, Agent, or Firm* — Oblon, Spivak, McClelland, Maier & Neustadt, L.L.P.

(57) ABSTRACT

An image processing apparatus includes a file management unit that manages files for image output, a file registration unit that registers the files, an output-configuration-information management unit that manages output configuration information, an output-configuration-information registration unit that registers the output configuration information, a data creation unit that creates the data in accordance with the output configuration information, and an output determination unit. When the file registration unit registers each of the files to the file management unit, the output determination unit determines whether the combined image can be outputted in accordance with certain output conditions. The output-configuration-information management unit registers predetermined output configuration information for the combined image and adds an output condition of the file that can be outputted to the output configuration information of the combined image.

19 Claims, 11 Drawing Sheets

FIG. 6

OUTPUT CONFIGURATION INFORMATION

| OUTPUT DOCUMENT ID | NAME OF ADMINISTRATOR OF OUTPUT DOCUMENT | REGISTERED USER LIST | REGISTERED DOCUMENT INFORMATION (FILE ID) | PRINT MODE |
|---|---|---|---|---|
| 1 | 004 | 001, 002, 003 | 1 | STAPLING 2 COPIES |
| | | | | |
| | | | | |
| | | | | |

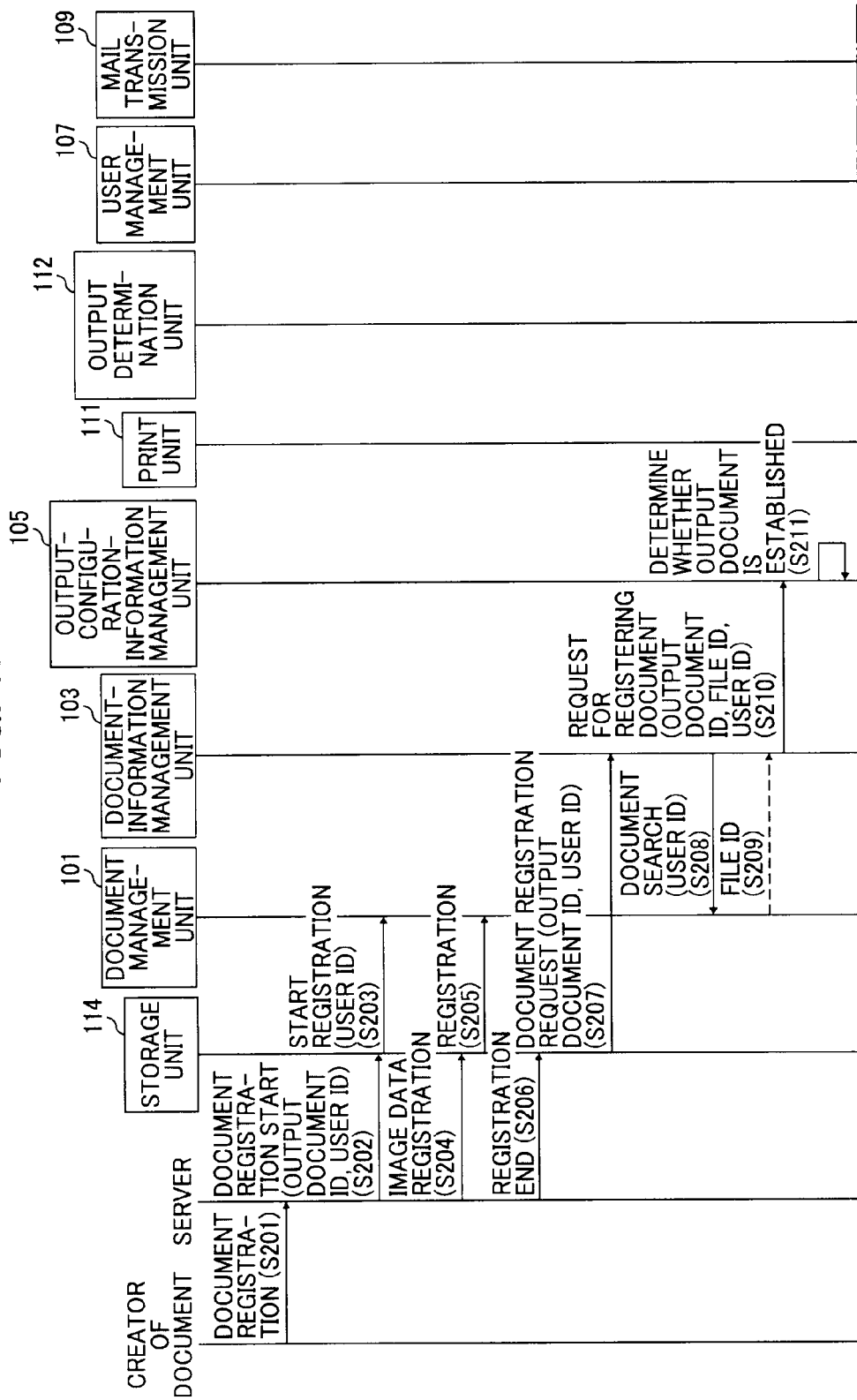

FIG. 8

DOCUMENT MANAGEMENT INFORMATION

| FILE ID | USER ID | IMAGE |
|---|---|---|
| 1 | 001 | Img1 |
| 2 | 002 | Img2 Img3 Img4 Img5 Img6 |
| 3 | 003 | Img7 Img8 |
| | | |

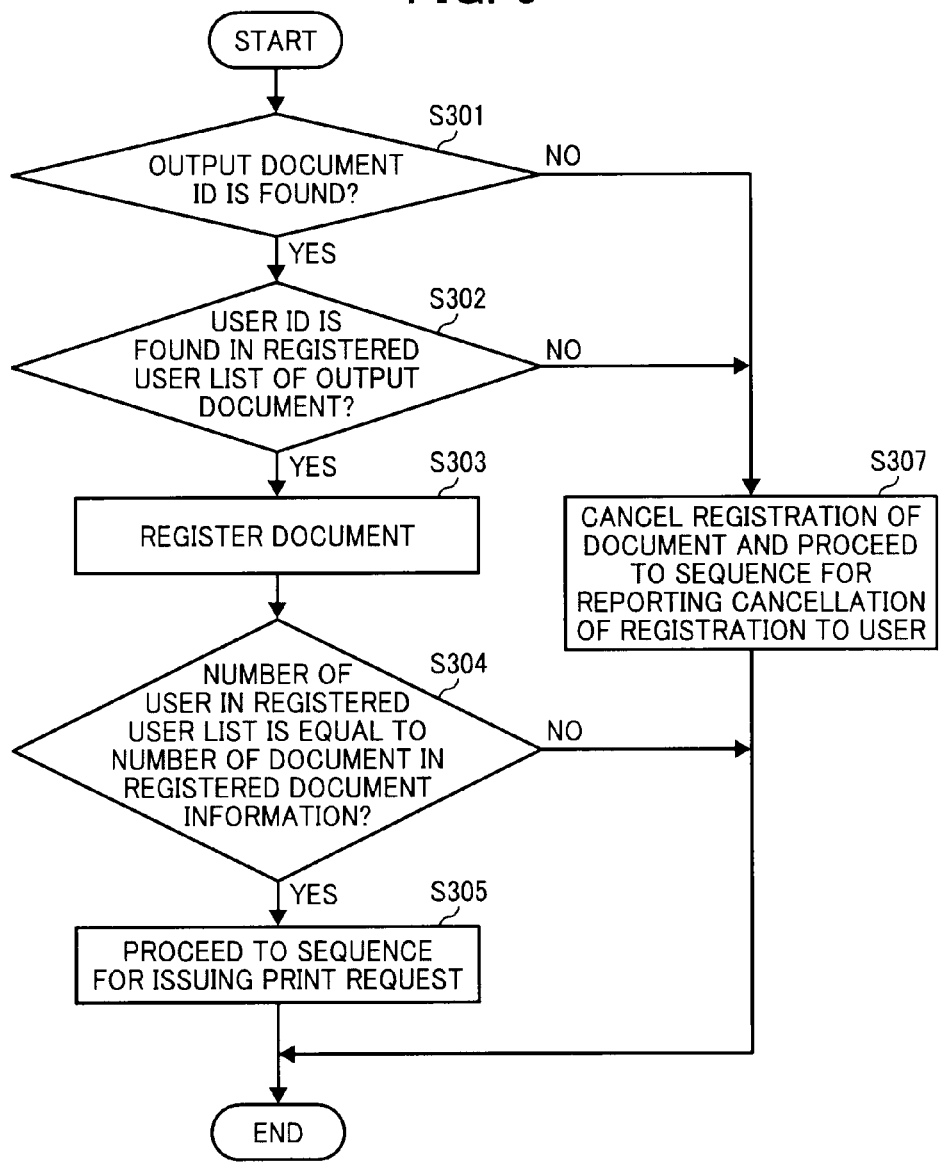

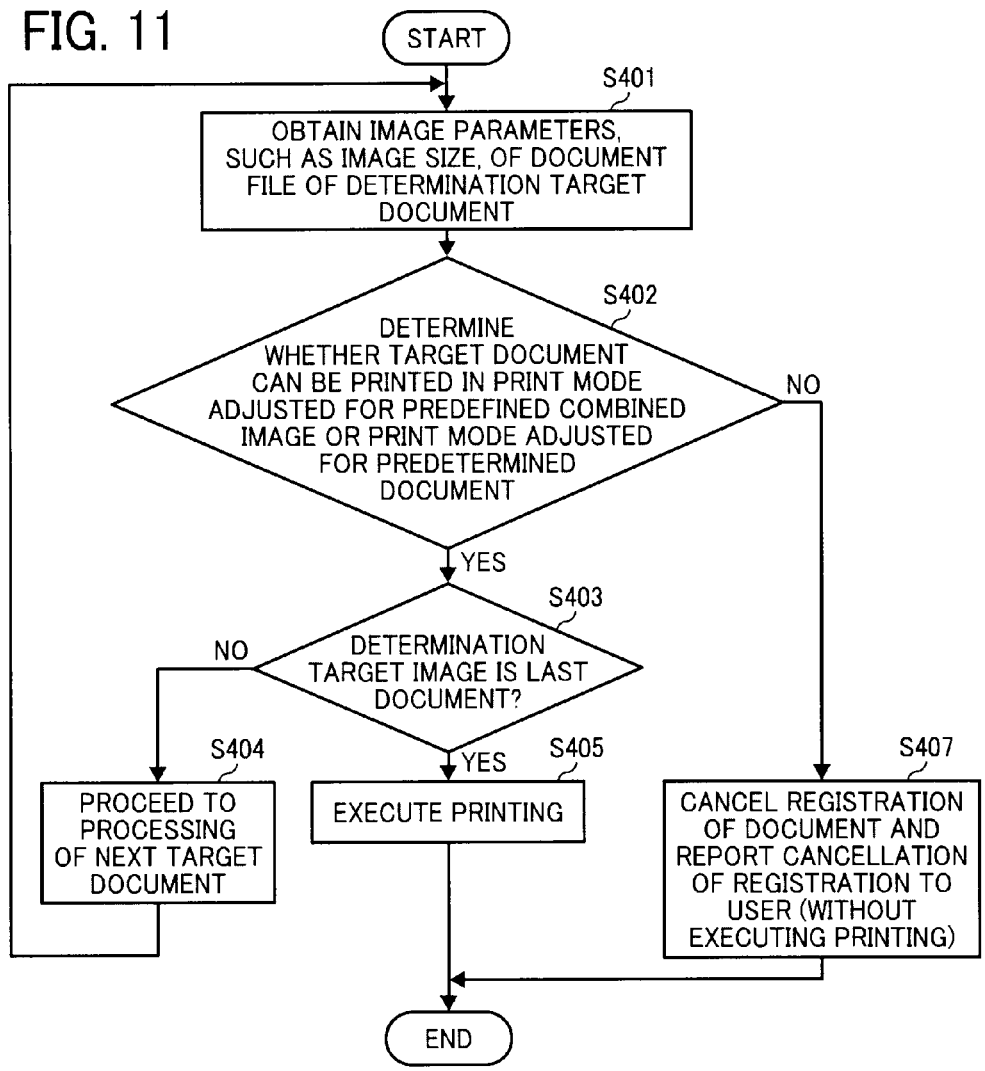

IMAGE PROCESSING APPARATUS, METHOD OF MANAGING IMAGE OUTPUT, AND STORAGE MEDIUM

CROSS-REFERENCE TO RELATED APPLICATIONS

The present patent application claims priority pursuant to 35 U.S.C. §119 from Japanese Patent Application No. 2009-167960, filed on Jul. 16, 2009 in the Japan Patent Office, which is incorporated herein by reference in its entirety.

BACKGROUND OF THE DISCLOSURE

1. Field of the Disclosure

Exemplary embodiments of the present disclosure relate to an image processing apparatus, such as a printer and a multifunctional periphery, that outputs document information as a visible image on a sheet of paper or other recording medium, and more specifically, an image processing apparatus that manages image output in which a plurality of files is combined to output an image, a method of managing the image output, and a storage medium that stores program codes causing an image processing apparatus to execute the method of managing the image output.

2. Description of the Background

As image processing apparatuses that perform processing for representing document information as a visible image on a sheet of paper or other recording medium, for example, printers and multi-functional peripherals (MFPs) are widely used.

Such an image processing apparatus may be connected to a network and utilized by external devices via the network. Such external devices include, for example, personal computers (PC) or servers that create and use document information, and exchange data with the image processing apparatus to constitute an image processing system.

In such an image processing system, the image processing apparatus is used in various ways. For example, a plurality of users may create documents using different means and request the image processing apparatus to output (print) the documents as images in accordance with different output conditions. Hence, the image processing apparatus may have capabilities of processing such a request. In such a case, generally, the image processing system handles target documents in the form of files. Such target document files may contain not only text but also images and graphics, and the term "document" used herein refers to the above-described document file to be processed by the image processing system.

Receiving the image-output request, the image processing apparatus temporarily stores a plurality of documents received, combines (merges) the plurality of documents into a single merged document, and outputs (prints) the merged document as an image. For such processing, a conventional management technique is proposed that determines whether target documents can be merged and, if it is determined that the target documents cannot be merged, stops printing the documents.

Such merging is proposed in, for example, JP-2006-139611-A. In JP-2006-139611-A, to reduce the burden on an operator who instructs merging, a document management method is proposed that virtually combines a plurality of document files into a single combined document to print the document files as virtually combined. In the management of the virtually-combined documents, if a document to be combined or a sub-group of documents is set so as not to be printed, the document or sub-group is not printed.

For such a conventional technique of managing merging, however, only in printing or registering an entire (merged) document is it confirmed whether there is an unprintable document among target documents to be merged and determined whether the respective target documents can be printed. Thus, the output of the merged document depends on the determination results. Further, if there is a conflict in the setting of output conditions between the merged document created by the merging and each of the target documents, stopping the printing is performed by the above-described management function.

Even when printing is stopped by the conflict in the setting of output conditions, however, in certain cases modifying the setting to solve the conflict allows the merged document to be printed. However, the creators of the respective documents have no way of knowing which documents should be modified or how the documents should be modified, and thus cannot easily modify the settings so as to enable the merged document to be outputted.

SUMMARY

In at least one exemplary embodiment, there is provided an improved image processing apparatus including a file management unit, a file registration unit, an output-configuration-information management unit, an output-configuration-information registration unit, a data creation unit, and an output determination unit. The file management unit manages a plurality of files for image output. The file registration unit registers the files managed by the file management unit. The output-configuration-information management unit manages output configuration information in accordance with which the files managed by the file management unit are combined to create data for outputting a combined image. The output-configuration-information registration unit registers the output configuration information managed by the output-configuration-information management unit. The data creation unit creates the data for outputting the combined image in accordance with the output configuration information managed by the output-configuration-information management unit. When the file registration unit registers each of the files to the file management unit, the output determination unit determines whether the combined image can be outputted in accordance with an output condition of the output configuration information previously defined for outputting the combined image, an output condition designated for a file to be registered, and an output condition added to the output configuration information in connection with a file already registered. Before registering the files for outputting the combined image to the file management unit, the output-configuration-information management unit registers the predetermined output configuration information for the combined image and, when the output determination unit determines that each of the files for outputting the combined image can be outputted, adds an output condition of the file that can be outputted to the output configuration information of the combined image.

In at least one exemplary embodiment, there is provided an improved method of managing image output for combining files to output a combined image. The method includes including registering, determining, adding, cancelling, and creating. The registering registers predetermined output configuration information for the combined image before registering the files to a file management unit. The determining determines whether the combined image can be outputted in accordance with an output condition set for each of the files in registering each of the files to the file management unit, an output condition added to the output configuration information in the registering of the predetermined output configuration information, and an output condition added to the output configuration information in connection with registration of a file already registered. If it is determined by the determining that the combined image can be outputted in registering a file of the files, the adding adds an output condition of the file that can be outputted to the output configuration information for the combined image. If it is determined by the determining that the combined image cannot be outputted in registering a file of the files, the cancelling cancels registration of the file that cannot be outputted. The creating creates data for outputting the combined image in accordance with the output configuration information managed by the determining.

In at least one exemplary embodiment, there is provided an improved computer-readable recording medium containing instruction codes that cause an image processing apparatus to execute a method including registering, determining, adding, cancelling, and creating.

BRIEF DESCRIPTION OF THE DRAWINGS

Additional aspects, features, and advantages will be readily ascertained as the same becomes better understood by reference to the following detailed description when considered in connection with the accompanying drawings, wherein:

FIG. 6 is a table showing an example of output configuration information managed by an output-configuration-information management unit of the control system;

FIG. 8 is a table showing an example of document management information managed by a document management unit of the control system;

FIG. 9 is a flow chart illustrating steps performed by the output-configuration-information management unit of the control system;

FIG. 10 is a table showing an example of user information managed by a user management unit of the control system;

FIG. 11 is a flow chart illustrating steps performed by an output determination unit of the control system; and FIG. 12 is a table illustrating another example of output configuration information managed by the output-configuration-information management unit.

Figure 1:
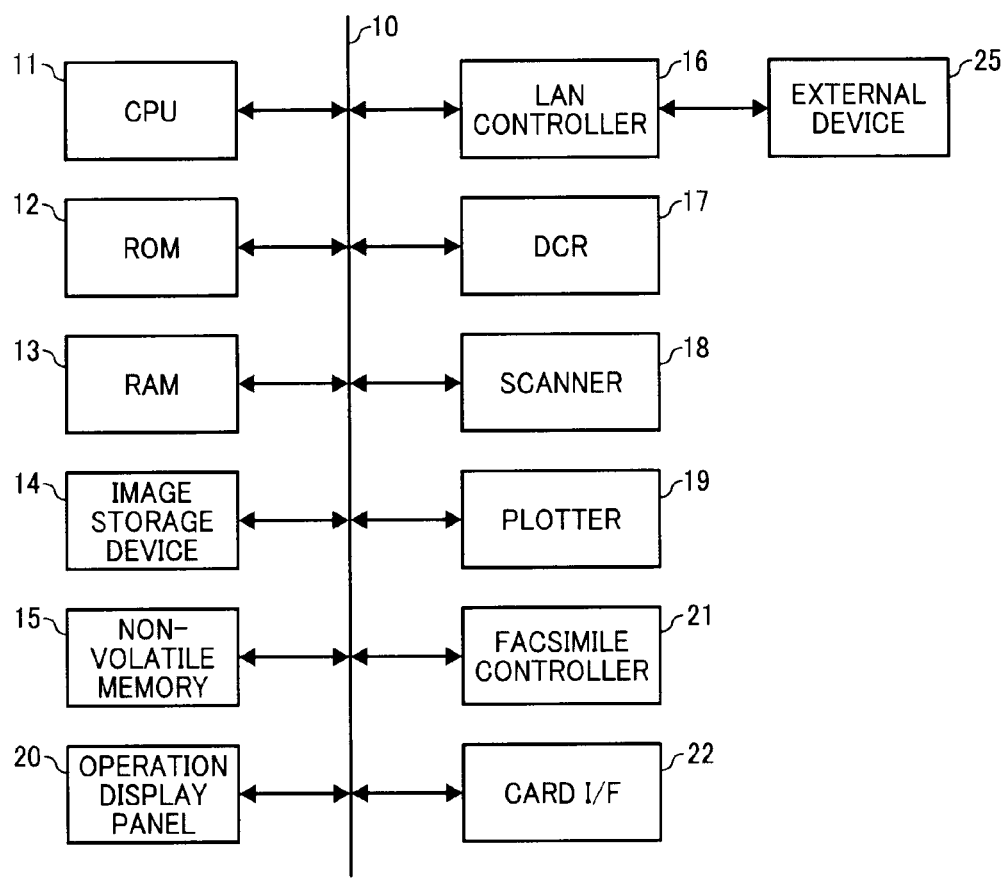
FIG. 1 is a block diagram illustrating a schematic hardware configuration of a MFP according to an exemplary embodiment of this disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF EXEMPLARY EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the exemplary embodiments are described with technical limitations with reference to the attached drawings, such description is not intended to limit the scope of the invention and all of the components or elements described in the exemplary embodiments of this disclosure are not necessarily indispensable to the present invention.

Below, exemplary embodiments according to the present disclosure are described with reference to the attached drawings.

First, an image processing apparatus and an image-output management method according to an exemplary embodiment according to the present disclosure are described taking an example of a multi-functional peripheral (MFP).

The MFP according to this exemplary embodiment has capabilities of a copier, a printer, a facsimile machine (hereinafter, referred to as FAX), and a scanner. In processing an image using such capabilities, if a processing target is a document, image data is inputted by reading an image of the document with a scanner. Alternatively, if the processing target is inputted from an external device via a communication unit, computerized image (print) data is inputted. In both cases, the inputted image data is processed to be general-purpose image data available for output, and managed as a file for image output (hereinafter "documents file" or simply "document") by, e.g., an image storage apparatus as is usually performed. When the data managed as the image output file is inputted, output conditions for the data are designated by a user. Accordingly, the image output file is stored together with data indicating the output conditions designated for the image data.

The output conditions for the image output file are related to controllable operations of a print engine (plotter), a sheet feed section, and other output sections of the MFP, and include the sheet size, sheet type, number of copies to be outputted, modes of outputting an image on a sheet (e.g., magnification, double-side printing, aggregated printing, and edit), and image processing conditions (e.g., color/monochrome selection, density), post processing (e.g., sorting, stapling) and other conditions. A control unit transmits control instructions with control parameters to a relevant process(es) and an operation unit(s) in accordance with such output conditions designated by a user.

However, since the mechanical conditions of the MFP vary over time, even if outputting an image is requested based on an image output file previously stored, the image might not be outputted as intended. Further, if the image output file stored is inputted from an external device (e.g., a PC and/or a server) by data exchange via, e.g., a local area network (LAN), the MFP might not be able to process output conditions attached to the image output file.

The MFP according to this exemplary embodiment combines image output files separately managed in an image storage device to perform combined-image output. The MFP also has a capability (combined-image processing capability) of creating image output data for the combined-image output.

The image output files subjected to such combined-image processing may be files stored through different processes. Accordingly, the output conditions attached might include output conditions which the MFP does not support, or combining image output files may prevent normal output.

Hence, in this exemplary embodiment, the MFP has a capability of managing the combined-image output. In the management of combined-image output, as described below, when an image output file is registered as a file for combined-image output, it is determined whether a combined image can be outputted. If the combined image cannot be outputted, the cause is reported to a registrant (creator) of the file so as to easily deal with the cause to output the image.

Next, a configuration of the MFP is described below.

[Schematic Configuration of Hardware of MFP]

FIG. 1 is a block diagram illustrating a schematic configuration of hardware of the MFP according to this exemplary embodiment. In FIG. 1, a central processing unit (CPU) 11 is a processor for executing software (programs), a read only memory (ROM) 12 is a memory device that stores programs, and a random access memory (RAM) 13 is a memory device that temporarily stores data during execution of programs. The CPU 11, the ROM 12, and the RAM 13 form a main control unit.

When the main control unit implements a system of managing (controlling) combined-image output (illustrated in FIG. 2) using software, programs described below (see control sequences illustrated in FIGS. 5 and 7 and control flows illustrated in FIGS. 9 and 11) cause a computer including the CPU 11, the ROM 12, and the RAM 13 to execute such processing. In executing processing, the CPU 11 loads a control or processing program, which is stored in the ROM 12, on the RAM 13 that serves as a working memory. The recording (storage) medium to record (store) programs is not limited to the ROM 12 and may be any other computer-readable recording medium such as a hard disk drive (HDD), a compact disk read only memory (CD-ROM), and a digital versatile disk (DVD). Such programs may be downloaded to such a recording medium via a network, e.g., the Internet.

An image storage device 14 is a storage device that stores image data on a large-volume recording medium, e.g., an HDD. Such image data is received from, e.g., a scanner 18 that inputs image data, an external device 25 (e.g., a PC or a server), via a LAN controller 16, and an external facsimile (FAX) machine via a FAX controller 21. In this exemplary embodiment, image data inputted as a processing target is stored in the image storage device 14 and managed as an image output file by a processing request. When reused for print output or data transmission, the image output file is read from the image storage device 14. Image output files used for combined-image output are stored in the image storage device 14 (see a storage unit 114 illustrated in FIG. 2).

A non-volatile memory 15 is a non-volatile storage device that stores setting information such as default setting values to be retained even when the power is off.

The LAN controller 16 is a controller that controls connection to a network, such as Ethernet (registered trademark) or wireless LAN. In this exemplary embodiment, image output files used for combined-image output are received from the external device 25, such as a PC or a server, via the LAN controller 16.

The FAX controller 21 is a controller that transmits and receives FAX data via a public line.

A DCR 17 is a converter that converts image data (e.g., bitmap data), which is inputted through capabilities of a printer, a facsimile machine, and a scanner, to an image file to be stored in the image storage device 14.

The scanner 18 is a reader that converts an original of paper document to image data (e.g., bitmap data).

A plotter 19 is a device that prints (outputs) image data on, e.g., a sheet of paper.

A card interface (I/F) 22 is an interface connected to a card-type removable recording medium, such as a secure digital (SD) card, to transmit and receive data to/from the recording medium. The recording medium connected to the card I/F 22 may be used in a similar manner, for example, to store image files.

An operation display panel 20 is a user interface under control of the main control section and includes a liquid-crystal-display (LCD) touch panel as an operation screen. The operation display panel 20 is a graphical user interface (GUI) device that receives a processing request or execution instruction of a job from a user and notifies the user of a status of executing the job through the operation screen. In this exemplary embodiment, output configuration information of a combined image is created using input screens of a display unit 121 (illustrated in FIGS. 2 and 5) of the operation display panel 20.

An internal bus 10 is a bus through which data is transmitted between the above-described devices.

[Management System of Combined-Image Output]

In the management of combined-image output according to this exemplary embodiment, when an image output file (document) for combined-image output is registered, it is determined whether a combined image can be outputted. If the combined image cannot be outputted, the following processing steps 1 to 3 are performed to enable a registrant (creator) to take measures to output the combined image.

Processing 1: Register output configuration information of combined-image output data in advance. The output configuration information registered in this processing is still incomplete since image output files (documents) are not registered.

Processing 2: Determine whether a combined image can be outputted when image output files (documents) for combined-image output are stored. In other words, it is determined whether output configuration information of combined-image output data in which an additional image output file is combined can be registered.

Processing 3: Identify an image output file (document) preventing the combined image from being outputted and report the file to the registrant.

A configuration of a control system of managing combined-image output according to this exemplary embodiment is described with reference to FIG. 2.

Figure 2:
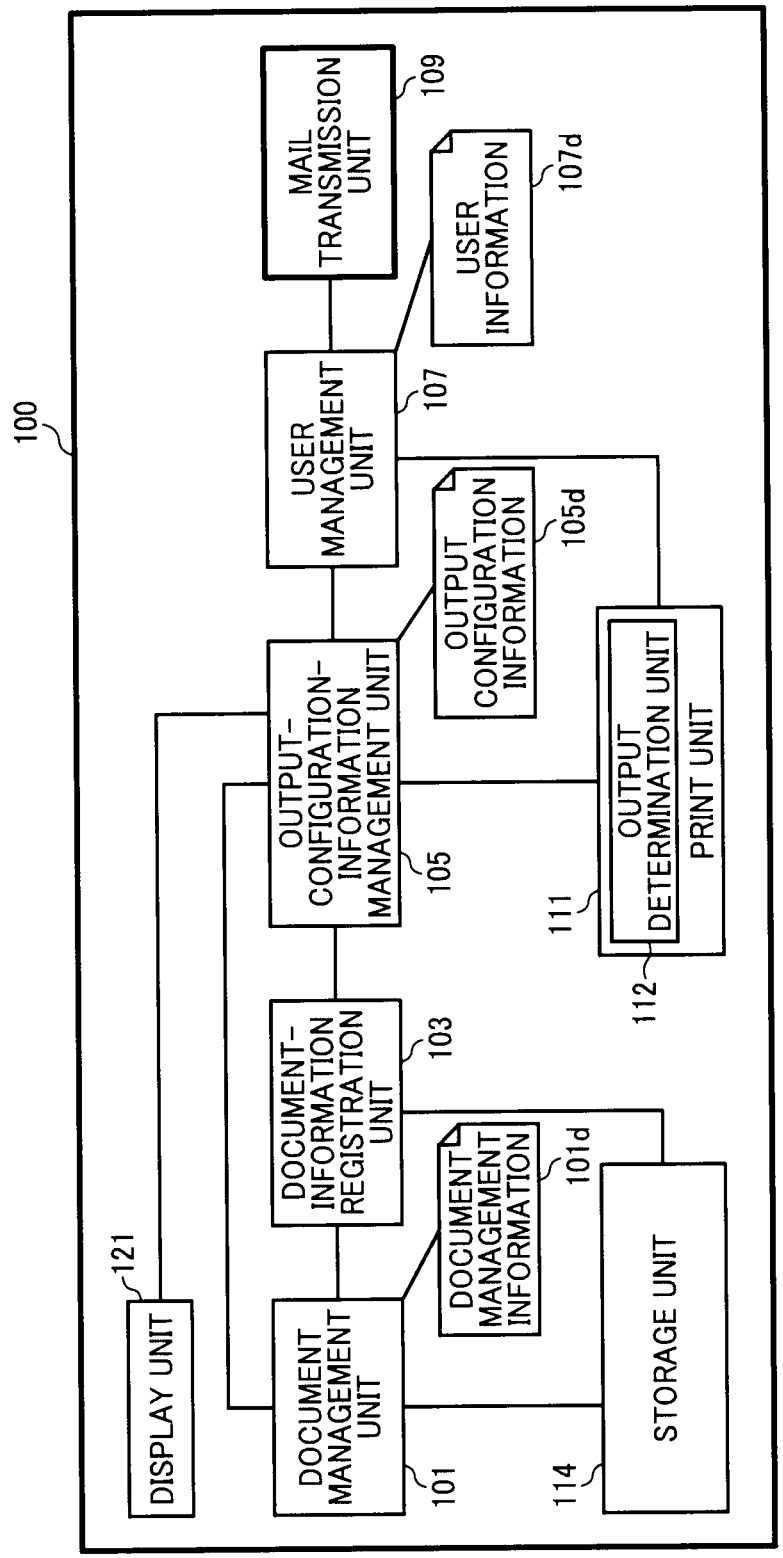
FIG. 2 is a block diagram illustrating a schematic configuration of a control system of the MFP illustrated in FIG. 1 that manages output of a combined image created from a plurality of files.

In FIG. 2, a document management unit 101 manages document management information 101d (illustrated in FIG. 8) stored (registered) in the storage unit 114 and works in the above-described processing 2 and 3.

The output-configuration-information management unit 105 manages output configuration information 105d of the combined image (illustrated in FIGS. 6 and 12) and works through the processing steps 1 through 3.

When the registration of the output configuration information of the combined image is received, the output-configuration-information management unit 105 exchanges data with the display unit 121 serving as an operation input unit of an administrator of the combined-image output and with the document management unit 101 and a document-information registration unit 103 to input information on image output files (documents) to be combined.

The output-configuration-information management unit 105 also exchanges data with an output determination unit 112 of a print unit 111 that determines whether the output configuration information of the combined-image output data received can be registered and with a user management unit 107 that reports to a registrant about an image output file preventing the combined image from being outputted.

The user management unit 107 manages user information 107d (illustrated in FIG. 10) and works in the above-described processing 3. To report to a registrant an image output file preventing the combined image from being outputted, the user management unit 107 exchanges data with the output determination unit 112 and a mail transmission unit 109 that reports to the registrant via e-mail.

The mail transmission unit 109 sends an e-mail to report the disapproval of the output (registration) to a registrant having an address in the external device 25 via the LAN controller 16.

[Modes of Managing Documents Constituting Combined Image]

Next, modes of managing image output files for combined-image output are described taking several examples. It is to be noted that image output file is referred to as "document" hereinafter.

Figure 3:
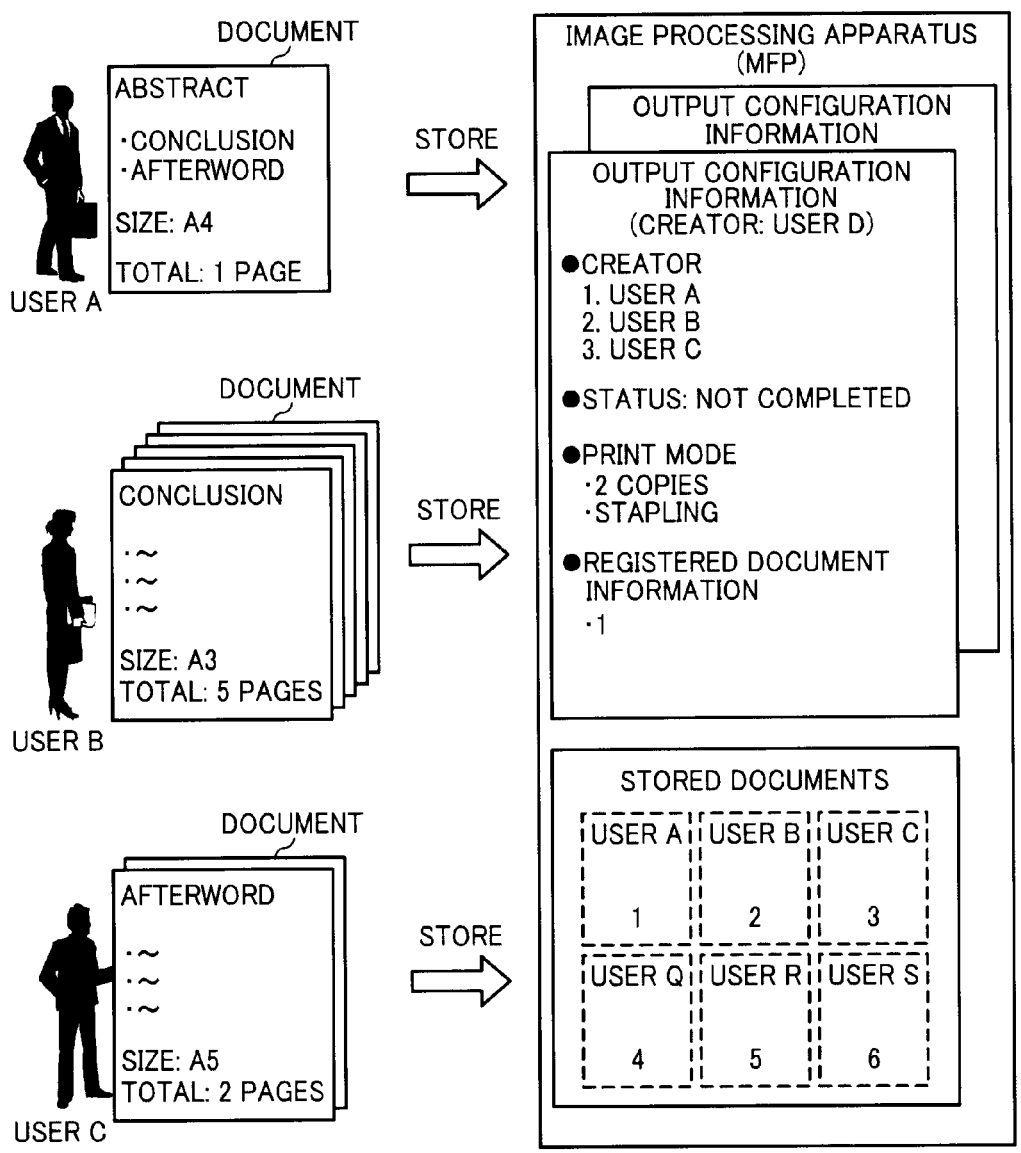
FIG. 3 is a diagram illustrating a concept of mode of management of document files for combined-image output.

FIG. 3 is an illustration showing a concept of mode of managing documents for combined-image output.

As illustrated in FIG. 3, documents created by users A, B, and C are registered as documents for combined-image output, stored on the storage unit 114 of the control system of the MFP in association with file IDs (e.g., file IDs 1, 2, and 3 for stored documents in FIG. 3), and managed by the document management unit 101. In addition to the contents of documents, such documents are stored in association with data representing output conditions, such as image size and the number of pages, designated by the registrant.

The registration of documents by the registrant is performed in a manner in which the registrant and the MFP can recognize the documents to be registered as documents constituting a combined image. That is, the registrant recognizes the document to be registered as one of the documents constituting combined-image output to perform the registration. Receiving the registration, the MFP assigns both an output document ID of the single combined (integrated) image and a user ID to each document. To perform the registration process, output configuration information of combined-image output data needs to be created in advance.

Such output configuration information of combined-image output data is created by a creator of a combined image (e.g., user D in FIG. 3) in advance as information that defines a configuration of the combined-image output, and managed by the output-configuration-information management unit 105. Accordingly, when a registrant registers a previously-created document, the output configuration information created by the creator of the combined image is already prepared at non-registration state together with other unregistered documents. In FIG. 3, the creators of the registered documents (users A, B, and C), completion status of output configuration information (e.g., incomplete), print mode defining output conditions (print copies: 2 copies, post-processing: stapling), and registered information (file ID: 1) are managed as output configuration information and used in the registration process by the registrant.

If the creators (registrant) shown in the output configuration information managed finishes the registration process and the output configuration information turns to be completed, that is, it is determined that the output configuration information can be registered, the combined-image output data is created and image output (e.g., printing in FIG. 3) is performed.

[Creation of Output Configuration Information (Before Document Registration)]

Next, a procedure of creating output configuration information that defines a configuration of combined-image output is described below.

As described in the processing 1, in the control system 100 illustrated in FIG. 2 that manages combined-image output, output configuration information of combined-image output data is created and the output configuration information created is registered before the registrant registers documents. In the control system 100 according to this exemplary embodiment, output configuration information is created according to an instruction of the creator of the combined image (i.e., the supervisor of the output document) issued using the operation display panel 20 (the display unit 121).

The creation process of output configuration information is described with reference to FIGS. 4 and 5.

Figure 4:
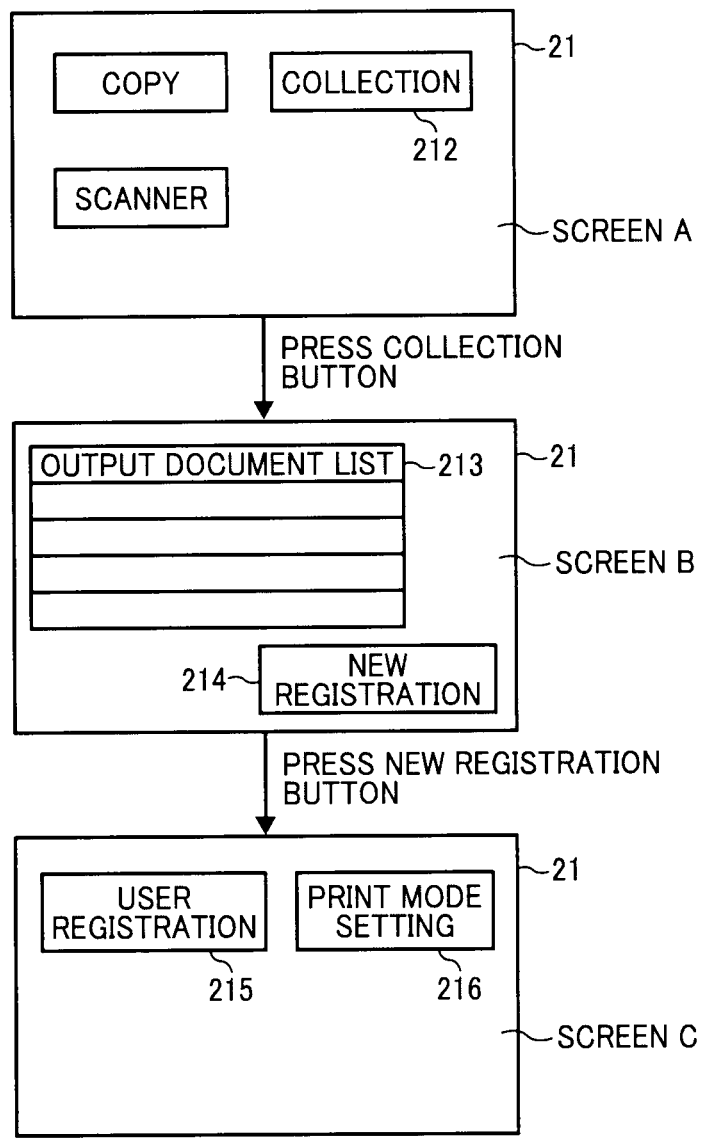
FIG. 4 is a diagram illustrating input screens A, B, and C sequentially displayed in creating output configuration information of a combined image.

FIG. 4 is a diagram illustrating input screens A, B, and C of the display unit 121 sequentially displayed in creating output configuration information of a combined image.

Figure 5:
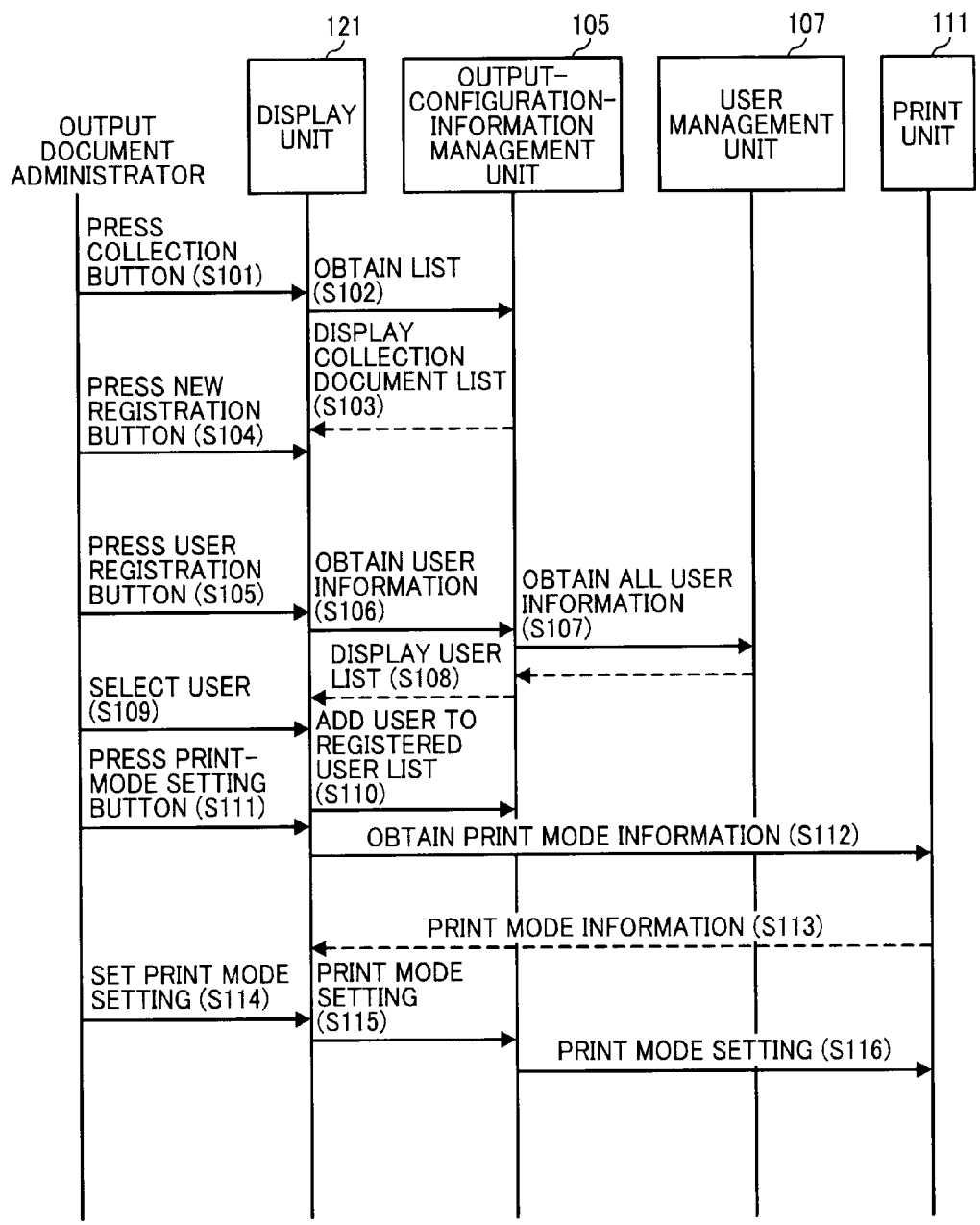
FIG. 5 is a sequence diagram illustrating a control sequence of creation of the output configuration information performed by the control system illustrated in FIG. 2.

FIG. 5 is a sequence diagram illustrating a procedure of controlling the creation of output configuration information performed by the control system 100 that manages combined-image output.

In the control sequence illustrated in FIG. 5, at S101 the administrator of an output document (hereinafter simply "administrator") selects and presses an application (function) button relating to output configuration information from among application (function) selection buttons displayed on the input screens of the display unit 121. On the initial screen "A" illustrated in FIG. 4, for example, a collection button 212 is displayed as the button for selecting an application (function) relating to output configuration information. The term "collection" used herein means that the application collects a plurality of created documents and combines the documents into a single combined image. When the collection button 212 is selected to create output configuration information, the administrator (e.g., user D) may be requested to input the name used as management data.

When the display unit 121 detects that the collection button 212 is pressed, the display unit 121 transmits to the output-configuration-information management unit 105 a request for acquiring listed data of output configuration information (of collected documents) managed in output configuration information 105d.

The display unit 121 receives the listed data of the output configuration information 105d returned from the output-configuration-information management unit 105 in response to the acquisition request sent at S102, and in accordance with the listed data, at S103 switches the input screen A illustrated in FIG. 4 to the input screen B that displays an output-configuration-information (output-document) list 213.

In FIG. 4, the input screen B displays the list 213 at which output configuration information is not registered yet. After the registration, the plurality of output documents is displayed to be distinguishable by IDs (see output configuration information illustrated in FIG. 6).

As illustrated in the input screen B of FIG. 4, a new registration button 214 is provided on the screen that displays the list 213. When the display unit 121 detects that the button 214 is pressed by the administrator, at S104 the display unit 121 switches the input screen B to the input screen C for registering the output configuration information of the combined image.

The input screen C includes, e.g., a user registration button 215 and a print-mode setting button 216 as buttons for creating output configuration information of a combined image, and is used when the administrator of the combined image inputs such information. In this exemplary embodiment, output document IDs for distinguishing a plurality of output documents are automatically numbered in order of, e.g., 1, 2, 3, and so on by the MFP. Accordingly, buttons for allocating such output document IDs are not provided on the input screens. However, it is to be noted that such buttons may be added so that the user (administrator) can input given codes as the output document IDs.

When at S105 the display unit 121 detects that the user registration button 215 of the input screen C is pressed, at S106 the display unit 121 reports to the output-configuration-information management unit 105 that the user registration button 215 is pressed as the new registration.

When the output-configuration-information management unit 105 receives the report, the output-configuration-information management unit 105 recognizes the report as a request for acquiring user information 107d at the new registration, i.e., an acquisition request for all user information. However, since the user information 107 is not managed under the output-configuration-information management unit 105, the output-configuration-information management unit 105 sends to the user management unit 107 a request to acquire the list data of all user information from the user information 107d managed by the user management unit 107.

The display unit 121 receives the list data of all user information of the output configuration information acquired via the output-configuration-information management unit 105 in response to the acquisition request at S106, and at S108 displays on the screen a list of users in accordance with the list data.

Next, from the list of users displayed on the screen of the display unit 121, at S109 the administrator selects a user as a creator of each document constituting a combined image of which output configuration information is to be created.

When the display unit 121 detects the user selection by the administrator, at S110 the display unit 121 sends to the output-configuration-information management unit 105 a request to write information of the selected user into the output configuration information of the combined image in process of creation.

In parallel with the user selection at S109, the administrator sets a print mode as an output condition of the combined image subjected to the new registration.

In the setting procedure, when at S111 a print-mode setting button 126 of the input screen C is pressed by the administrator, the display unit 121 detects that the print-mode setting button 126 has been pressed, and at S112 sends to the print unit 111 a request to acquire information on a print mode available for the output.

When the print unit 111 receives the request and reports to the display unit 121 the information on the print mode available, at S113 the display unit 121 displays a setting input screen so that the administrator cannot set a print mode unavailable as the output condition in accordance with the reported information.

At S114, the administrator inputs setting of a print mode through the setting input screen displayed on the display unit 121.

When the display unit 121 detects the input of the print mode, the display unit 121 reports to the output-configuration-information management unit 105 the information on the print mode inputted at S114.

When the output-configuration-information management unit 105 receives the information reported, the output-configuration-information management unit 105 writes the print mode inputted at S114 as a print mode of the output configuration information of the combined image under preparation. In case the setting may be changed, at S116 the output-configuration-information management unit 105 also sets the print mode inputted at S114 to the print unit 111.

The above-described sequence is the procedure of creating output configuration information.

"Output Configuration Information (1)"

FIG. 6 is a table showing an example of output configuration information 105d managed under the output-configuration-information management unit 105.

The output configuration information 105d illustrated in FIG. 6 includes data on a plurality of items, such as output-document administrator and registered user list as management information of document and registered document information and print mode as document information, for each combined image in association with each other.

In the output configuration information 105d, the combined image is distinguished by a specific output-document ID. In this exemplary embodiment, when an administrator of an output document registers new output configuration information (see FIGS. 4 and 5), a new number is automatically allocated to an output document as the output document ID.

Regarding the administrator name of the output document, when the administrator registers new output configuration information (see FIGS. 4 and 5), for example, a password previously set at the registration of the administrator may be inputted to obtain the name (user ID) of the administrator written in the output configuration information 105d.

Regarding the registered user list, a user ID attached to the request (at S110) for registering a user selected by the administrator at S109 is obtained, and the output-configuration-information management unit 105 writes the user ID obtained to the registered user list of the output configuration information 105d.

Regarding the registered document information, file IDs attached when the creator (registrant) registers created documents constituting a combined image are obtained.

Regarding the print mode, a print mode set at S114 by the administrator as the output condition of the combined image newly registered is obtained, and the output-configuration-information management unit 105 writes the print mode obtained to the output configuration information 105d.

[Management of Combined-Image Output in Document Registration]

Next, a description is given of management of combined-image output in storing (registering) separately-created documents used for the combined-image output.

As described in the processing 2 and 3, when storing (registering) separately-created documents, the control system 100 illustrated in FIG. 2 that manages combined-image output determines whether the combined image can be outputted (printed), i.e., whether output configuration information of the combined image in which the documents are to be combined can be registered, identifies a causal document(s) that prevents the combined image from being outputted, and reports to the registrant (creator) of the causal document(s) that the causal document(s) prevents the combined image from being outputted. In this exemplary embodiment, the control system 100 performs processing involving the management of the combined-image output in response to a registration procedure in which creator(s) of separate documents for the combined image perform from an external device 25, such as a PC or a server, via the LAN controller 16.

Figure 7B:
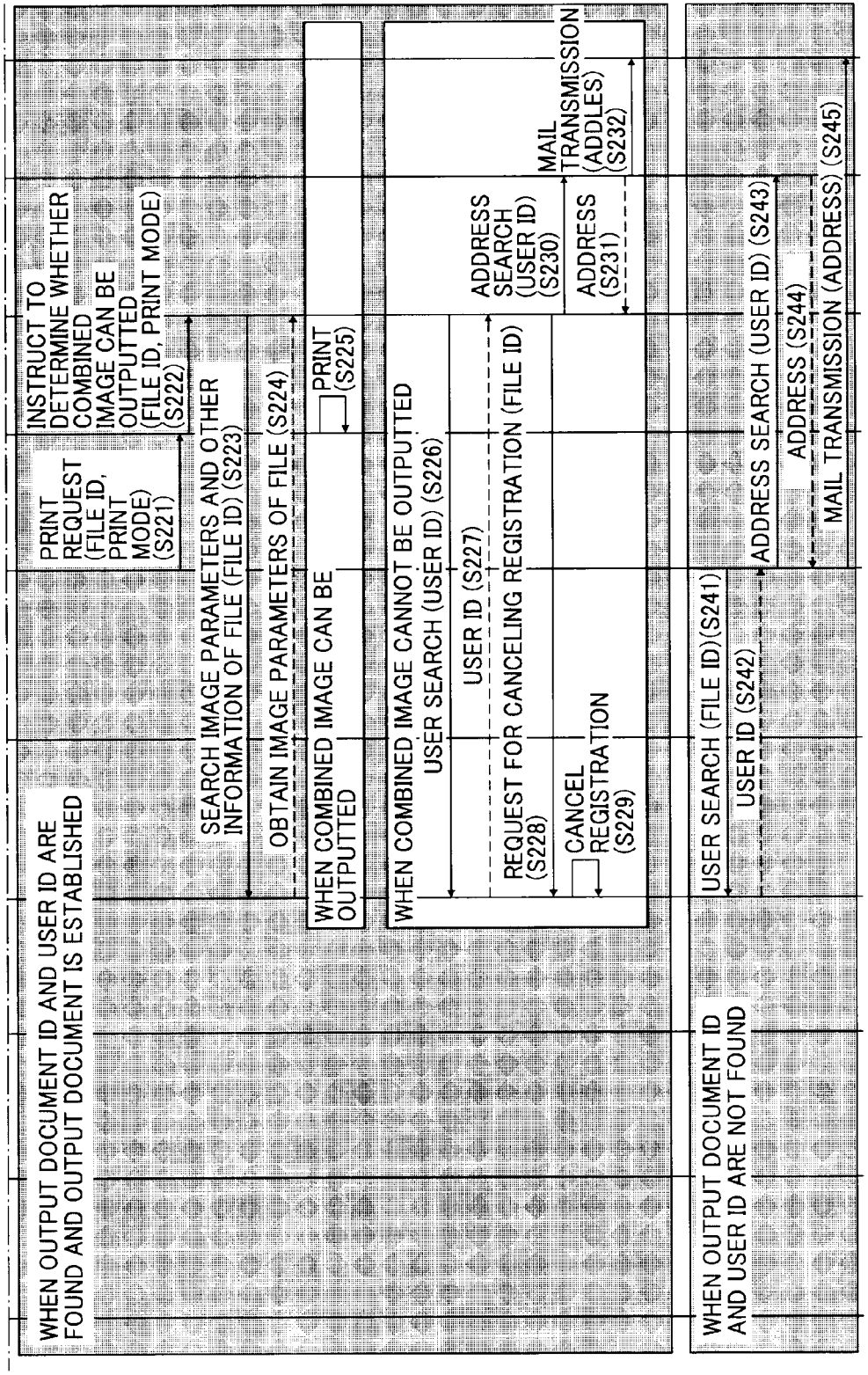
FIG. 7 is a sequence diagram illustrating a control sequence of document registration performed by the control system.

FIG. 7 is a sequence diagram illustrating a control processing sequence performed at the registration of documents by the control system 100 that manages combined-image output.

Below, a processing procedure of managing combined-image output at the registration of documents is described with reference to FIG. 7.

In the control sequence of FIG. 7, when a document for combined-image output is stored in a server, at S201 the creator of the document (hereinafter referred to as simply "creator") instructs the server to start the registration procedure of the document for the combined-image output. At this time, as information required for the registration procedure, an output document ID that identifies the combined image and a user ID of the creator contained in output configuration information (see FIG. 6) previously created by the administrator of the output document are reported to the server.

In accordance with the instruction of the creator, at S202 the server sends to the storage unit 114 of the MFP a request for registering a document file along with the output document ID of the combined image and the user ID of the creator to start the registration process.

When the storage unit 114 receives the registration request from the server, at S203 the storage unit 114 sends to the document management unit 101 a request for starting the registration procedure of the document file. At this time, the storage unit 114 sends to the document management unit 101 the user ID of the creator attached to the document file to be registered.

After the registration process is started, at S204 the storage unit 114 receives image data of the document file to be registered from the server and at S205 sends to the document management unit 101 a request for managing the image data. The document management unit 101 associates the user ID of the creator with the image data, allocates a file-ID number to the image date, and creates document management information (i.e., registers the document).

"Document Management Information"

FIG. 8 is a table showing an example of document management information 101d managed under the document management unit 101.

In the document management information 101d illustrated in FIG. 8, the user ID of the creator of the document is associated with the image data constituting the file for each of the registered images that are distinguished by the file IDs. Image data illustrated in FIG. 8 is data managed in unit of page, and when a file contains a plurality of pages, the file contains a plurality of pieces of image data. For example, a file ID 3 contains two image pieces: Img7 and Img8.

Regarding the relationship between the document management information 101d and the output configuration information 105d of the combined image illustrated in FIG. 6, in the registration document information of the output configuration information 105d, all the documents to be combined are shown by the file IDs of the document management information 101d.

In the control sequence illustrated in FIG. 7, when the registration of the document file requested from the server is finished at S206, at S207 the storage unit 114 sends to the document information registration unit 103 the output document ID of the combined image (e.g., the output document ID: 1 in FIG. 6) and the user ID (e.g., the user ID: 001 in the registered user list illustrated in FIG. 6) and requests the output-configuration-information management unit 105 to register the document.

When the document information registration unit 103 receives the registration request, the document information registration unit 103 sends to the document management unit 101 a request for searching for the document using the user ID (001).

When the document management unit 101 receives the search request, the document management unit 101 searches the document management information 101d (see FIG. 8) for the user ID (001), obtains the file ID (1) associated with the user ID (001) as a search result, and at S209 sends the file ID (1) to the document information registration unit 103.

At S210, the document information registration unit 103 identifies a document file to be registered in accordance with the received file ID (1), sends the file ID (1) along with the output file ID (1) and the user ID (001) to the output-configuration-information management unit 105, and requests the output-configuration-information management unit 105 to register the document file to the output configuration information 105d.

[Determination Whether a Combined Image Can Be Outputted]

When the output-configuration-information management unit 105 receives the request for registering the document file (file ID: 1), at S211 the output-configuration-information management unit 105 determines whether the output condition of the output configuration information is satisfied. If the output condition is satisfied, the output-configuration-information management unit 105 registers the document file to the output configuration information 105d. By contrast, if the output condition is not satisfied, the output-configuration-information management unit 105 does not register the document file to the output configuration information 105d.

In this exemplary embodiment, the output-configuration-information management unit 105 and the output determination unit 112 of the print unit 111 determine at two steps whether combined-image output can be performed. At S211 (described below with reference to steps performed by illustrated in FIG. 9), the output-configuration-information management unit 105 determines whether a document file to be registered meets formal output conditions (e.g., the number of combined documents and the user ID of the document) of the output configuration information that defines a configuration of the combined image, i.e., whether the output document is established. Meanwhile, at S222 (described below with reference to steps performed by illustrated in FIG. 11), the output determination unit 112 determines whether a document file to be registered meets output conditions relating to the contents of image output (e.g., the number of copies and print mode including post processing).

[Establishment of Output Document]

Here, a determination process performed at S211 by the output-configuration-information management unit 105 is further described with reference to FIG. 9.

When the output-configuration-information management unit 105 receives the request for registering the document file (e.g., file ID: 1) subjected to registration to the output configuration information 105d, at S301 the output-configuration-information management unit 105 determines whether the output document ID (:1) received from the document information registration unit 103 is found in the output configuration information (illustrated in FIG. 6). Since the output document ID indicates that the corresponding document file (file ID: 1) is a component of the combined image of the output document ID (:1), the presence of the output document ID is a requirement for establishment of the output document.

If the output document ID (:1) is found in the output configuration information 105d (YES at S301), at S302 the output-configuration-information management unit 105 confirms the consistency of user ID which is a subsequent requirement for establishment of the output document, in other words, determines whether the user ID (:001) received from the document information registration unit 103 is found in the output configuration information 105d. The presence/absence of the user ID is determined based on whether the user ID is found in the registered used list of the target output document (ID: 1). For example, in FIG. 6, user IDs 001, 002, and 003 are found in the registered user list.

Here, if the user ID (:001) is found in the output configuration information 105d (YES at S302), the requirements for establishment of the output document at S301 and S302 are met and at S303 the output-configuration-information management unit 105 registers the target output document (ID: 1) to the output configuration information 105d.

By contrast, if the output document ID (:1) is not found in the output configuration information 105d (NO at S301) or the user ID (:001) is not found in the registered user list of the output document (ID: 1) of the output configuration information 105d (NO at S302), at S307 the output-configuration-information management unit 105 stops the registration of the target output document (ID: 1), proceeds to a sequence (of S241 to S245 of FIG. 7 described below) for reporting to the creator of the target output document (ID: 1) that the target output document is not registered, and exits from the process flow.

After the target output document is registered at S303, in order to decide whether a print request is to be issued in accordance with the output configuration registered, at S304 the output-configuration-information management unit 105 compares the number of documents listed in the registered document information of the output configuration information 105d and the number of users in the registered user list and determines whether the number of documents is equal to the number of users.

If the number of documents is equal to the number of users (YES at S304), the process proceeds to a sequence (of S221 to S225 in FIG. 7 described below) in which the target output document can be printed and exits from the process flow. For example, assuming that, after user A (001) and user B (002) register documents, user C resisters a document, both the number of users in the registered user list and the number of documents in the registered document information are three, and the process proceeds to the sequence in which printing is executable.

By contrast, if the number of documents is not equal to the number of users (NO at S304), the output-configuration-information management unit 105 determines that there is still a file to be registered and exits from the processing flow without doing nothing. In such a case, an unregistered document is registered according to the sequence illustrated in FIG. 7. Meanwhile, the output document cannot be executed until the output document is established.

[Establishment of Output Condition]

If after the process flow illustrated in FIG. 9 it is determined that the output document is established and the process proceeds to the sequence in which printing the output document is executable, further processing is performed according to a control sequence of S221 to S232 (in an upper shaded area) illustrated in FIG. 7.

For the control sequence of FIG. 7, at S221 the output-configuration-information management unit 105 sends to the print unit 111 the output document ID (:1) registered in the output configuration information 105d and the print mode containing print conditions (e.g., post-processing: stapling, the number of prints: 2 copies in a setting example of FIG. 6) and requests printing (image output).

When the print unit 111 receives the print request, at S222 the print unit 111 instructs the output determination unit 112 of the print unit 111 to determine whether the combined image is to be outputted.

In the determination whether the combined image can be outputted, registered documents constituting a combined image (e.g., three registered documents of file IDs 1, 2, and 3 associated with registered user IDs 001, 002, and 003 in the setting example illustrated in FIG. 6) are determined in turn on whether the combined image can be outputted based on the following output conditions 1 to 3.

1) Output conditions designated in output configuration information previously defined for the combined-image output (e.g., "stapling, 2 copies" in the print mode illustrated in FIG. 6).

2) Output conditions of one document of the registered documents subjected to the current determination.

3) Output conditions of the output configuration information added relating to registered documents, i.e., documents already determined that outputting (printing) is executable and registered to the output configuration information 105d.

In other words, it is determined whether, when the output conditions are incorporated to the output configuration information, there is no conflict between the above-described print modes (output conditions) and a print engine (plotter) of the MFP and an output section, such as a sheet feed unit, are normally operated.

To perform the above-described determination, at S223 the output determination unit 112 requests the document management unit 101 to search for, e.g., image parameters added to the registered documents as output condition using the file IDs 1, 2, and 3 of the registered documents.

When the document management unit 101 receives the search request, at S224 the document management unit 101 searches the document management information 101d (see FIG. 8) and obtains, as a search result, image parameters or other data added to the respective registered documents of the file IDs 1, 2, and 3 and sends such data to the output determination unit 112.

Next, a determination process of the output determination unit 112 for determining whether a combined image can be outputted is described with reference to steps performed by illustrated in FIG. 11.

The output determination unit 112 deals one by one with the file IDs (1, 2, and 3) of the documents subjected to the determination. At S401, the output determination unit 112 acquires image parameters or other data of one target document subjected to the determination from data indicating a print mode of each registered document obtained as the search result at S224.

Next, at S402 the output determination unit 112 determines whether outputting with the print mode (e.g., image parameters) set to the target document is executable.

When a first document of the target documents is determined, the output determination unit 112 determines whether there is a conflict between image parameters (e.g., image size and the number of pages) for the target document acquired from the document management unit 101 and the print mode of output configuration information previously designated by the administrator. If there is no conflict, the output determination unit 112 determines that the document can be outputted.

If a second or later document is determined after one or more documents have already determined as executable, the output determination unit 112 determines whether there is a conflict between image parameters (e.g., image size and the number of pages) for the target document acquired from the document management unit 101 and the print modes added to the output configuration information in connection with the registered documents (which have already determined as outputtable and registered in the output configuration information 105*d*) or whether the print engine (plotter), the sheet feed unit, and/or another output unit of the MFP normally operate. Based on the result of determination, the output determination unit 112 determines whether the target document can be outputted.

For example, when determination process is performed in order of users A, B, and C, first, it is determined whether a document file of user A can be printed with print conditions (stapling and two copies) previously designated in the output configuration information. Here, if the file of user A can be printed with the print conditions (stapling and two copies), the output determination unit 112 proceeds to the next step and determines a file of user B. In determining whether the file of user B can be outputted, since the print condition of the file of user A has been added to the output configuration information 105*d*, it is necessary to determine the print condition of the file of user B along with the print condition of the file of user A. For example, if the file of user A contains an A4-size image and the file of user B contains an A3-size image, both the files can be printed with the print condition of stapling and two copies. Accordingly, the output determination unit 112 determines that the files of users A and B can be outputted and proceeds to the following determination of a file of user C. However, if the file of user C is set to A5 size, the A4-size file of user A, the A3-size file of user B, and the A5-size file of user C cannot be printed with the condition of stapling, and the output determination unit 112 determines that these three files cannot be outputted.

In the process flow illustrated in FIG. 11, if it is determined that one file of the target documents can be outputted (YES at S402), at S403 the output determination unit 112 confirms whether the file is the last document of the target documents.

Here, if the file is not the last document of the target documents (NO at S403), the output determination unit 112 proceeds to the determination of the next file of the target documents and repeats the output determination process from S401.

The determination process loop is repeated on all files (ID: 1, 2, and 3) of the target documents. If it is determined that all files can be outputted (YES at S403), at S405 the process exits from the processing flow and proceeds to a sequence for printing.

The printing sequence is performed at S225 (i.e., an unshaded section titled "if outputting is executable" in the upper shaded area) illustrated in FIG. 7. At S225, printing is performed according to the output configuration information 105*d* in which the print conditions of all files (ID: 1, 2, and 3) to be combined have been added, and the process ends.

At S402 of determining whether outputting with a print mode (e.g., image parameters) designated for the target document is executable, if it is determined that outputting with the print mode is unexecutable (NO at S402), at S407 the output determination unit 112 indentifies a document preventing the outputting, cancels the registration of the target document, proceeds to a cancellation report sequence for reporting to the registrant (creator) that the target document has been cancelled, and exits from the process flow.

The sequence of cancelling a document registration and reporting cancellation of the registration is performed at S226 to S232 (i.e., an unshaded section titled "if outputting is unexecutable" in the upper shaded area) illustrated in FIG. 7.

In the sequence of "if the combined image cannot be outputted", the output determination unit 112 identifies a causal document that prevents the combined image from being outputted. The causal document is not limited to the target document subjected to the determination process (see a section of "Identification of cause that prevents combined-image output" described below).

The output determination unit 112 cancels the registration of the document identified as the cause that prevents combined-image output, and reports the cancellation to the registrant of the document. In such a case, as the causal document is not limited to the target document subjected to the current processing, a plurality of registered documents having been already determined needs to be cancelled.

Accordingly, at S226 the output determination unit 112 requests the document management unit 101 to search for a registrant of the registered document using a file ID of the registered document.

When the document management unit 101 receives the search request, at S227 the document management unit 101 searches the document management information 101*d* (see FIG. 8), obtains a user ID associated with the registered document of the file ID, and sends the user ID to the output determination unit 112.

To cancel the registration of the document identified as the causal document, at S228 the output determination unit 112 sends to the document management unit 101 a request for cancelling the registration attached with the file ID of the causal document.

When the document management unit 101 receives the cancellation request, the document management unit 101 cancels the registration of the document having the file ID designated in the cancellation request.

Next, the output determination unit 112 reports the cancellation of the registration to the registrant of the document. In this processing, the cancellation of the registration and a reason why combined-image output is unexecutable (see "Identification of cause that prevents combined-image output" described below) are reported to the creator of the causal document via a communication unit.

At S230, the output determination unit 112 requests the user management unit 107 to search a mail address of the registrant.

"User Information"

FIG. 10 is a table showing an example of user information 107*d* managed by the user management unit 107.

In the user information 107*d* illustrated in FIG. 10, user IDs (001, 002, 003, and 004) for identifying users are associated with user names and mail addresses.

User information 107*d*, document management information (illustrated in FIG. 8), and output configuration information (illustrated in FIG. 6) are associated with one another via user IDs (i.e., data in the registered user list of the output configuration information).

When the user management unit 107 receives the request of S230, at S231 the user management unit 107 searches the user information 107*d* (illustrated in FIG. 10), obtains as a search result a mail address associated with a user ID searched, and sends the mail address to the output determination unit 112.

At S232, the output determination unit 112 requests the mail transmission unit 109 to send an email to the received mail address to report a reason of cancelling a registered document.

Thus, it is determined that the output document has been established and the processing sequence for printing the output document is finished.

In the process flow illustrated in FIG. 9, if the output document has not been established, in other words, the output document ID is not found in the output configuration information 105*d* (NO at S301) or the user ID is not found in the registered user list of the output configuration information

105*d* (NO at S302), the process proceeds to the following processing sequence described below.

In such a case, a sequence of stopping the registration of an output document and reporting to a creator of the output document that the output document has not been registered is executed.

In the sequence, at S241 the output-configuration-information management unit 105 requests the document management unit 101 to search for a registrant of a registered document to be using a file ID of the registered document.

When the document management unit 101 receives the search request, at S242 the document management unit 101 searches the document management information 101*d* (see FIG. 8), obtains as a search result a user ID associated with the file ID of the registered document, and sends the user ID to the output-configuration-information management unit 105.

Next, the output-configuration-information management unit 105 reports to the registrant of the registered document that registration of the document has failed.

Next, the output-configuration-information management unit 105 reports to the registrant of the registered document that registration of the document has failed. In this exemplary embodiment, such a report that a combined output document has not been established is sent to the registrant of the document by email.

At S243, the output-configuration-information management unit 105 requests the user management unit 107 to search for a mail address of the registrant using the user ID of the registrant that is attached to the unregistered document and obtained at S242.

When the user management unit 107 receives the search request, at S244 the user management unit 107 searches the user information 107*d*, obtains as a search result a mail address associated with the user ID, and sends the mail address to the output-configuration-information management unit 105.

At S245, the output-configuration-information management unit 105 requests the mail transmission unit 109 to send an email to the received mail address to report that the document has not been registered. The mail transmission unit 109 sends the email to the registrant of the unregistered document.

Thus, the processing sequence performed when document registration is stopped as an output document is not established is finished.

In the above-described exemplary embodiment, when documents for combined-image output are registered, the registrant (creator) or administrator can confirm that the document registration does not meet a predetermined output condition of an output document for a combined image, i.e., the output document is not established, that there is a conflict between an output condition attached to each target document subjected to registration and an output condition set to the output document for the combined image (including conditions additionally registered to the output configuration information in association with a document(s) having already been registered, or that the print engine (plotter), the sheet feed unit, and another output unit do not normally operate with the output condition designated. The registrant (creator) or administrator can also take a measure to output the output document. Such a configuration makes the outputting process to the combined image easier, allowing a user to take full advantages of the combined-image output capability.

Further, as described above, when a document already-registered is cancelled, cancellation of the registration of the document and a reason why it is determined that the document cannot be outputted are reported to a user (registrant) of the document, thus allowing the user to promptly modify the document.

[Identification of Cause that Prevents Combined-Image Output]

As described above, the output determination unit 112 determines whether documents to be registered for a combined image can be outputted, and identifies a causal document that prevents the combined image from being outputted.

In the output determination, as illustrated in the processing flow of FIG. 11, if a conflict occurs between a print condition set to a target document subjected to the determination and a print condition (print mode) added to output configuration information in association with a document already registered, it is determined that the combined image cannot be outputted.

In identifying a document that prevents combined-image output, if one of conflicting documents is cancelled, the unexecutable state is resolved. Therefore, if one of conflicting documents is identified as a causal document and the identified document is an unregistered document, the registration of the identified document is cancelled. Alternatively, if the identified document is an already-registered document, the registration of the identified document is deleted. Thus, the executable state of the output of registered documents is maintained.

As one method of identifying such a document that prevents combined-image output, it is conceivable to identify a newly registered document, that is, a document currently subjected to the determination as a causal document that the combined image cannot be outputted.

For example, as described above, in FIG. 3, users A, B, and C are the creators of documents and stapling is designated in the print mode. Here, it is assumed that a user E is another creator of a document of an A3-size image and the documents of the users A, B, and E are already registered before the user C registers a document of an A5-size image. In such a case, when the user C registers the document of the A5-size image, it is determined whether a combined image cannot be outputted since there is a conflict between the document of the user C and each of the documents of the users B and E (of A3-size images). In this case, when the first method of identifying a causal document is employed, the document of the user C the causal document is identified as the causal document.

Thus, with the first method, a document currently subjected to new registration is identified as a causal document that prevents combined-image output and subjected to cancellation of the registration or other processing. Accordingly, processing is more simplified than when another conflicting document(s) is identified as the causal document. In other words, if another conflicting document(s) is identified as the causal document(s), the causal document(s) is reported to the creator(s) of the causal document(s) and it is necessary to wait for the creators' modification. By contrast, when the document currently registered is identified as the causal document, it is enough to respond to only an user currently accessing to the MFP, reducing the time required to finish registering information of all documents to output configuration information.

As another method of identifying a causal document that prevents combined-image output, it is conceivable to identify, as the causal document, one of less pages of a already-registered document (or a set of already-registered documents) and a new entry document. For example, if the total number of pages of an already-registered document(s) to constitute a combined image is less than the number of pages of a new-entry document, the already-registered document(s) is identified as the causal document. By contrast, if the total number of pages of an already-registered document(s) is greater than the number of pages of a new-entry document, the new-entry document is identified as the causal document.

For example, as described above, in FIG. 3, the users A, B, and C are the creators of documents and stapling is designated in the print mode. Here, it is assumed that the documents of the users A and B are already registered before the user C registers a document of an A5-size image of 2 pages. In such a case, when the user C registers the document, it is determined whether the combined image cannot be outputted since there is a conflict between the document of the user C and the document of the user B (of A3-size image and 5 pages). In such a case, when the second method of identifying a causal document is employed, the document of the user C (of 2 pages) less in the number of pages than the document of the user B (of 5 pages) is identified as the causal document.

When all documents listed in output configuration information cannot be printed as a combined image, the above-described methods can reduce the number of responses to modify print condition to resolve the unprintable state, thus reducing the processing load.

[Report to Administrator]

As described in the preparation of output configuration information, an administrator defines an output configuration of a combined image before entering documents and creates output configuration information 105d to manage the output of the combined image. The administrator also confirms with the output configuration information 105d whether the combined image can be outputted in entering each of the documents.

Accordingly, it is preferable for the administrator to learn not only a determination result of whether the combined image can be outputted but also a reason of the determination result, in particular, if it is determined that the combined image cannot be outputted.

In this exemplary embodiment, as described in "Identification of cause that prevents combined-image output", when an already-registered document(s) is identified as the causal document(s), the output determination unit 112 reports to the administrator of the combined image that the causal document is deleted from the documents to be registered.

For example, as described above, in FIG. 3, the users A, B, and C are the creators of documents and stapling is designated in the print mode. Here, it is assumed that the documents of the users A and B are already registered before the user C registers a document of an A5-size image of 2 pages. In such a case, when the user C registers the document, it is determined whether the combined image cannot be outputted since there is a conflict between the document of the user C and the document of the user B (of A3-size image and 5 pages). Here, when the document of the user B is identified as the causal document, the output determination unit 112 reports to the user D, an administrator of the output document, that the combined image cannot be outputted because of the condition of stapling set on the document of the user B. The name (user ID) of the administrator of the output document is obtained in association with an output document ID in the output configuration information (see FIG. 6), and a mail address of the output-document administrator is obtained in association with the user ID in the user information (see FIG. 10).

The procedure of reporting a causal document(s) subjected to deletion to the administrator of the output document is performed in a manner similar to the procedure of S230 to S203 in the sequence of FIG. 7.

Thus, by reporting to the administrator of the output document a reason why the combined image cannot be outputted, the administrator can determine whether the format of each document is to be modified or whether the print mode of the output configuration information is to be modified.

[Selection of Processing in Output Determination]

As described in "Identification of cause that prevents combined-image output", there is a plurality of different methods of identifying a cause that prevents combined-image output. If only one method is employed, an optimal performance may be not obtained.

Hence, a plurality of methods of identifying a causal document that prevents combined-image output and a plurality of processing types relating to the respective methods are provided in a selectable manner to obtain an optimal performance.

In this exemplary embodiment, a user operates the display unit 121 of the operation display panel 20 to select a desired processing type performed when the output determination unit 112 determines whether the combined image can be outputted.

As the method of identifying a causal document, one of the following processing types is selected and executed in accordance with an instruction of the user.

1) Identify an already-registered file for image output
2) Identify a newly-entered file for image output
3) Identify an already-registered file(s) for image output if the total number of pages of the already-registered file(s) for image output is less than the total number of pages of a newly-entered document, the already-registered document(s) is identified as the causal document. By contrast, if the total number of pages of an already-registered document(s) is greater than the total number of pages of a new-entry document, the new-entry document is identified as the causal document.

When the output determination unit 112 performs one of the processing types 1 to 3, as with the reporting procedure of S203 to S232 in the sequence of FIG. 7, the deletion of the document subjected to registration and the reason why it is determined that the combined image cannot be outputted are reported to related users.

In this regard, the administrator of the output document may be designated as a user who selects the processing type for output determination. Such a configuration allows the combined-image output to be managed in accordance with the intent of the administrator.

As described above, in this exemplary embodiment, the processing type for output determination is selectable and the method of identifying a causal document that prevents combined-image output can be changed depending on the state in which documents are registered in output configuration information.

[Handling of Unregistered Document]

The output determination unit 112 also determines whether combined-image output is executable based on the presence/absence of a conflict between the print condition of an unregistered document and the print condition of an already-registered document(s). Accordingly, registration of the unregistered document is constrained by the print condition of the already-registered document(s). Predicting such a constraint reduces the load of processing, such as deletion of a causal document and report of the deletion to users, in the output determination performed by the output determination unit 112.

Hence, in this exemplary embodiment, the output-configuration-information management unit 105 manages a registration standard in consideration of the constraint imposed by a print condition set on a already-registered document.

"Output Configuration Information"

FIG. 12 is a table showing an example of the output configuration information 105d managed by the output-configuration-information management unit 105.

The output configuration information 105d illustrated in FIG. 12 is the same as the output configuration information illustrated in FIG. 6 in document management information is listed for each combined image and different from the output configuration information illustrated in FIG. 6 in that registration standard is listed. In FIG. 12, a print condition that can be set as a result of the constraint of the registered document is shown as information listed for the registration standard.

For example, as described above, in FIG. 3, the users A, B, and C are the creators of documents to be registered and stapling is set in the print mode. If a document of A4-size image is first registered by the user A, the constraint that the image size is A3 or A4 is imposed on the following document to print under the condition of stapling set in the print mode. Accordingly, in addition to the image size A4, the image size A3 is added as a constraint on outputtable image size to the registration standard.

Such a constrained condition is reported to a user creating an unregistered document in accordance with the output configuration information 105d managed by the output-configuration-information management unit 105.

For example, in the above-described example of FIG. 3, the image size of the document of the user A is A4 and the image size of the registration standard is A3. Accordingly, a message that the outputtable image size is A3 or A4 is reported to the users B and C who create unregistered documents.

Such handling of unregistered documents allows a user who creates an unregistered document to modify the document in advance. Such a configuration allows the MFP to receive the document in an outputtable state, resulting in an increased processing speed and a reduced load of processing, such as cancelling a causal document that prevents combined-image output and reporting the cancellation to a user.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the scope of the present invention, and all such modifications are intended to be included within the scope of the present invention.

For example, elements and/or features of different exemplary embodiments may be combined with each other and/or substituted for each other within the scope of this disclosure and appended claims.

What is claimed is:

1. An image processing apparatus comprising:
a file management unit that manages a plurality of files for image output;
a file registration unit that registers the files managed by the file management unit;
an output-configuration-information management unit that manages output configuration information in accordance with which the files managed by the file management unit are combined to create data for outputting a combined image;
an output-configuration-information registration unit that registers the output configuration information managed by the output-configuration-information management unit;
a data creation unit that creates the data for outputting the combined image in accordance with the output configuration information managed by the output-configuration-information management unit; and
an output determination unit that, when the file registration unit registers each of the files to the file management unit, determines whether the combined image can be outputted in accordance with an output condition of the output configuration information previously defined for outputting the combined image, an output condition designated for a file to be registered, and an output condition added to the output configuration information in connection with a file already registered,
wherein, before registering the files for outputting the combined image to the file management unit, the output-configuration-information management unit registers the predetermined output configuration information for the combined image and, when the output determination unit determines that each of the files for outputting the combined image can be outputted, adds an output condition of the file that can be outputted to the output configuration information of the combined image.

2. The image processing apparatus according to claim 1, further comprising a communication unit that communicates with a user registering the files,
wherein, when the output determination unit determines that the combined image cannot be outputted, the output determination unit identifies a causal one of the files that prevents the combined image from being outputted and the communication unit reports on the causal file to a user.

3. The image processing apparatus according to claim 2, wherein the file management unit manages information in which the files are associated with users registering the files, cancels registration of the causal file identified by the output determination unit, and obtains information on a user registering the causal file cancelled and, in accordance with the information obtained on the user, the communication unit reports to the user the cancellation of the causal file and a reason for the determination that the combined image cannot be outputted.

4. The image processing apparatus according to claim 2, wherein the output determination unit identifies a file being newly registered of the files as the causal file.

5. The image processing apparatus according to claim 2, wherein the output determination unit identifies the causal file based on a total number of pages therein.

6. The image processing apparatus according to claim 5, wherein, if a total number of pages of a set of files already registered of the files for outputting the combined image is smaller than a total number of pages of a file being newly registered, the output determination unit identifies the set of files already registered as the causal file, and if a total number of pages of a set of files already registered of the files for outputting the combined image is greater than a total number of pages of a file being newly registered, the output determination unit identifies the file being newly registered as the causal file.

7. The image processing apparatus according to claim 2, wherein, when it is determined that a file already registered cannot be outputted in combination with a file being newly registered, the output determination unit identifies the file already registered as the causal file,
wherein the output-configuration-information management unit manages information in which output configuration information is associated with a corresponding administrator who administrates the output configuration information and obtains information on an administrator of the output configuration information associated with the causal file identified by the output determination unit and, wherein, in accordance with the information on the administrator obtained by the output-configuration-information management unit, the communication unit reports to the administrator of the causal file on a reason for the determination that the combined image cannot be outputted.

8. The image processing apparatus according to claim 2, further comprising an instruction input unit that receives an instruction of a processing condition with which the combined image is outputted, wherein the output determination unit selectively performs a first determination process in which the output determination unit identifies a file already registered as the causal file, a second determination process in which the output determination unit identifies a file being newly registered as the causal file, and a third determination process based on the total number of pages in which, if a total number of pages of a set of files already registered of the files for outputting the combined image is smaller than a total number of pages of a file being newly registered, the output determination unit identifies the set of files already registered as the causal file, and if a total number of pages of a set of files already registered of the files for outputting the combined image is greater than a total number of pages of a file being newly registered, the output determination unit identifies the file being newly registered as the causal file, and wherein, when the output determination unit performs one of the first determination process and the third determination process, the file management unit manages information in which the files are associated with users registering the files and obtains information on a user registering the file already registered identified as the causal file by the output determination unit and, in accordance with the information on the user obtained, the communication unit reports to the user on a reason of the determination that the combined image cannot be outputted.

9. The image processing apparatus according to claim 1, further comprising a communication unit that communicates with users registering files for image output, wherein the file management unit manages first information in which files for outputting a combined image are associated with users registering the files and second information on a file already registered of the files and, in accordance with the first and second information, obtains third information on a user of an unregistered file, and wherein, in accordance with the information on the user of the unregistered file obtained by the file management unit, the communication unit reports to the user an output condition of the output configuration information including an output condition added in connection with the file already registered managed by the output-configuration-information management unit.

10. A method of managing image output for combining files to output a combined image, the method comprising:

registering, by a processor, predetermined output configuration information for the combined image before registering the files to a file management unit;

determining, by the processor, whether the combined image can be outputted in accordance with an output condition set for each of the files in registering each of the files to the file management unit, an output condition added to the output configuration information in the registering of the predetermined output configuration information, and an output condition added to the output configuration information in connection with registration of a file already registered;

if it is determined by the determining that the combined image can be outputted in registering a file of the files, adding an output condition of the file that can be outputted to the output configuration information for the combined image;

if it is determined by the determining that the combined image cannot be outputted in registering a file of the files, cancelling registration of the file that cannot be outputted; and creating, by the processor, data for outputting the combined image in accordance with the output configuration information managed by the determining.

11. The method according to claim 10, further comprising:

if it is determined by the determining that the combined image cannot be outputted in registering a file of the files, identifying the file as a causal file that prevents the combined image from being outputted; and reporting on the causal file to a user registering the causal file.

12. The method according to claim 11, further comprising:

managing information in which the files are associated with users registering the files;

canceling registration of the causal file identified by the identifying;

obtaining information on a user registering the causal file canceled; and reporting, in accordance with the information obtained on the user, to the user on the cancellation of the causal file and a reason for the determination that the combined image cannot be outputted.

13. The method according to claim 11, wherein the identifying identifies a file being newly registered of the files as the causal file.

14. The method according to claim 11, wherein the identifying identifies the causal file based on a total number of pages therein.

15. The method according to claim 14, wherein, if a total number of pages of a set of files already registered of the files for outputting the combined image is smaller than a total number of pages of a file being newly registered, the identifying identifies the set of files already registered as the causal file, and if a total number of pages of a set of files already registered of the files for outputting the combined image is greater than a total number of pages of a file being newly registered, the identifying identifies the file being newly registered as the causal file.

16. The image processing method according to claim 11, further comprising:

if it is determined by the determining that a file already registered cannot be outputted in combination with a file being newly registered, identifying the file already registered as the causal file;

managing information in which output configuration information is associated with a corresponding administrator who administrates the output configuration information;

obtaining information on an administrator of the output configuration information associated with the causal file identified by the identifying; and reporting in accordance with the information on the administrator obtained by the obtaining to the administrator of the causal file on a reason for the determination that the combined image cannot be outputted.

17. The image processing method according to claim 11, further comprising:

receiving an instruction of a processing condition with which the combined image is outputted, selectively performing a first determination process to identify a file already registered as the causal file, a second determination process to identify a file being newly registered as the causal file, and a third determination process based on the total number of pages in which, if a total number of pages of a set of files already registered of the files for outputting the combined image is smaller than a total number of pages of a file being newly registered, the set of files already registered is identified as the causal file, and if a total number of pages of a set of files already registered of the files for outputting the combined image is greater than a total number of pages of a file being newly registered, the file being newly registered is identified as the causal file;

managing information in which the files are associated with users registering the files;

obtaining information on a user registering the file already registered identified as the causal file by determining when one of the first determination process and the third determination process is performed; and reporting, in accordance with the information on the user obtained, to the user on a reason of the determination that the combined image cannot be outputted.

18. The image processing method according to claim 10, managing first information in which files for outputting a combined image are associated with users registering the files and second information on a file already registered of the files;

obtaining third information on a user of an unregistered file in accordance with the first and second information, and reporting, in accordance with the information on the user of the unregistered file obtained by the obtaining, to the user an output condition of the output configuration information including an output condition added in connection with the file already registered.

19. A non-transitory computer-readable recording medium containing instruction codes that cause an image processing apparatus to execute a method comprising:

registering predetermined output configuration information for the combined image before registering the files to a file management unit;

determining whether the combined image can be outputted in accordance with an output condition set for each of the files in registering each of the files to the file management unit, an output condition added to the output configuration information in the registering of the predetermined output configuration information, and an output condition added to the output configuration information in connection with registration of a file already registered;

if it is determined by the determining that the combined image can be outputted in registering a file of the files, adding an output condition of the file that can be outputted to the output configuration information for the combined image;

if it is determined by the determining that the combined image cannot be outputted in registering a file of the files, cancelling registration of the file that cannot be outputted; and creating data for outputting the combined image in accordance with the output configuration information managed by the determining.

* * * * *